United States Patent [19]
Takemura

[11] Patent Number: 5,576,857
[45] Date of Patent: *Nov. 19, 1996

[54] ELECTRO-OPTICAL DEVICE WITH TRANSISTORS AND CAPACITORS METHOD OF DRIVING THE SAME

[75] Inventor: Yasuhiko Takemura, Kanagawa, Japan

[73] Assignee: Semiconductor Energy Laboratory Co., Ltd., Kanagawa-ken, Japan

[*] Notice: The term of this patent shall not extend beyond the expiration date of Pat. No. 5,463,483.

[21] Appl. No.: 40,275

[22] Filed: Mar. 30, 1993

[30] Foreign Application Priority Data

| Apr. 2, 1992 | [JP] | Japan | 4-109340 |
| Apr. 17, 1992 | [JP] | Japan | 4-124323 |
| Apr. 17, 1992 | [JP] | Japan | 4-124325 |
| Apr. 17, 1992 | [JP] | Japan | 4-124326 |

[51] Int. Cl.⁶ .......... G02F 1/1343; G02F 1/136; G09G 3/36
[52] U.S. Cl. ............. 359/59; 359/57; 345/92
[58] Field of Search .......... 359/59, 57; 345/92, 345/61

[56] References Cited

U.S. PATENT DOCUMENTS

| 4,431,271 | 2/1984 | Okubo | 359/59 |
| 4,470,667 | 9/1984 | Okubo et al. | 359/68 |
| 4,775,861 | 10/1988 | Saito | 359/59 |
| 5,012,228 | 4/1991 | Masuda et al. | 345/92 |
| 5,095,304 | 3/1992 | Young | 345/92 |
| 5,151,689 | 9/1992 | Kabuto et al. | 359/59 |
| 5,165,075 | 11/1992 | Hiroki et al. | 345/92 |
| 5,193,018 | 3/1993 | Wu | 359/59 |
| 5,247,289 | 9/1993 | Matsueda | 359/59 |
| 5,383,041 | 1/1995 | Yamazaki et al. | 359/51 |

FOREIGN PATENT DOCUMENTS

| 4-5633 | 1/1992 | Japan | 359/59 |

*Primary Examiner*—William L. Sikes
*Assistant Examiner*—Ron Trice
*Attorney, Agent, or Firm*—Sixbey, Friedman, Leedom & Ferguson, P.C.; Gerald J. Ferguson, Jr.; Karlton C. Butts

[57] ABSTRACT

An improved liquid crystal display is described. The display comprises a liquid crystal panel provided with an active matrix circuit for driving the panel. A plurality of pixels are defined in a matrix in the liquid crystal panel. The pixels on the odd rows and the pixels on the even rows are located in the opposite sides of the column lines through which data signals are supplied.

21 Claims, 11 Drawing Sheets

FIG. 8(A-1)
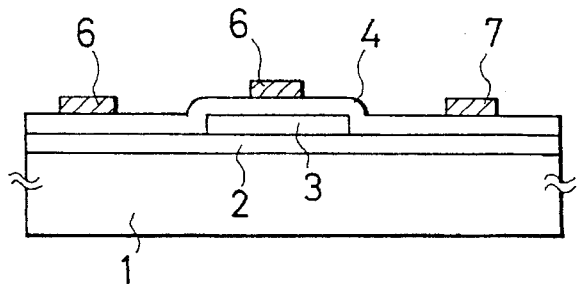
FIG. 8(A-2)
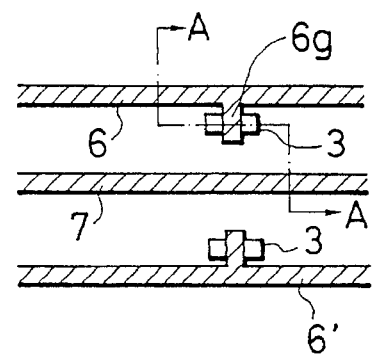
FIG. 8(B-1)
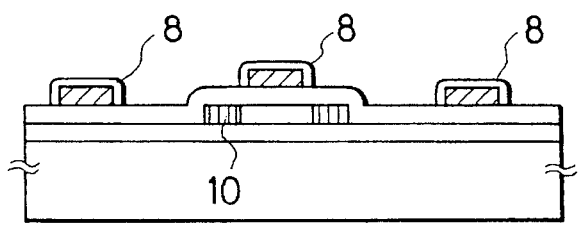
FIG. 8(B-2)
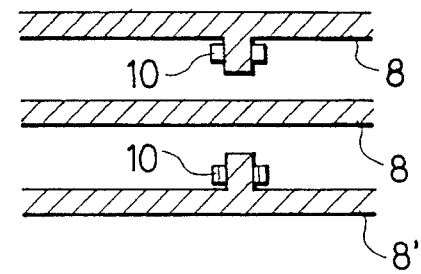
FIG. 8(C-1)
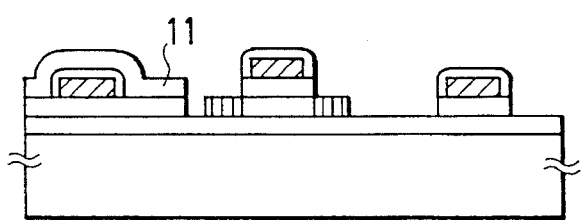
FIG. 8(C-2)
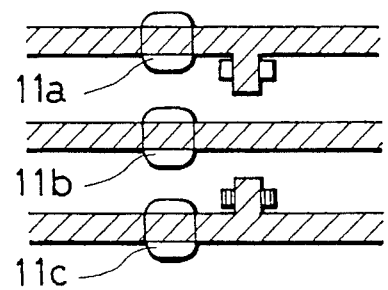
FIG. 8(D-1)
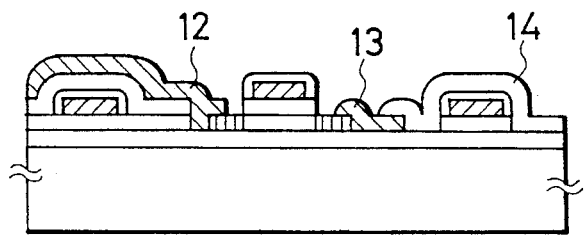
FIG. 8(D-2)
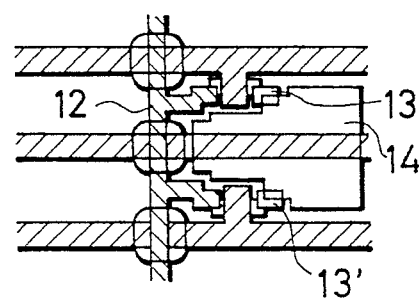

FIG. 10(A-1)
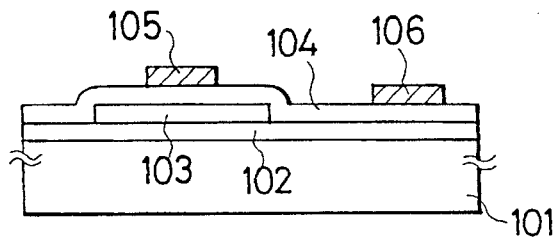
FIG. 10(A-2)
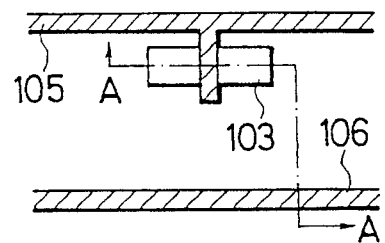
FIG. 10(B-1)
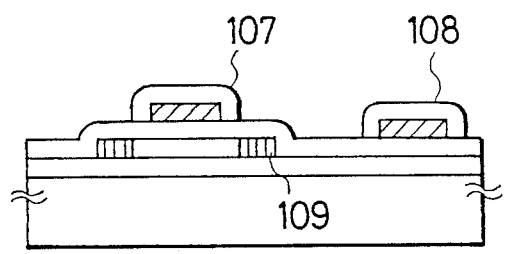
FIG. 10(B-2)
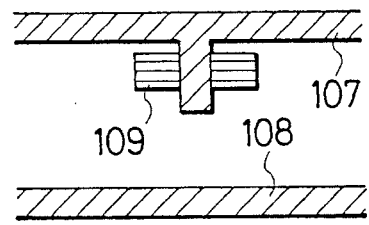
FIG. 10(C-1)
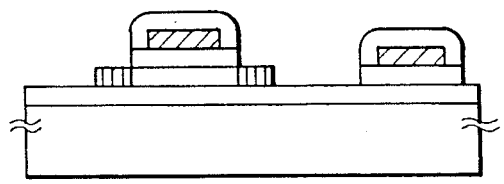
FIG. 10(C-2)
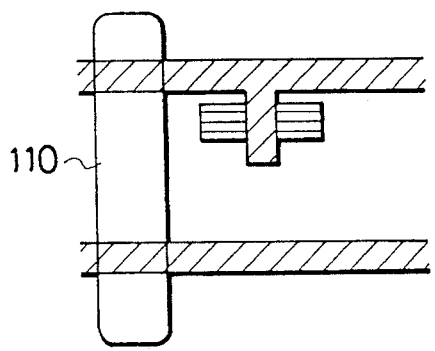
FIG. 10(D-1)
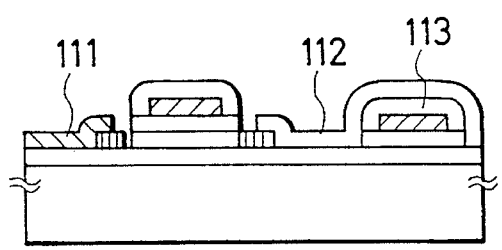
FIG. 10(D-2)
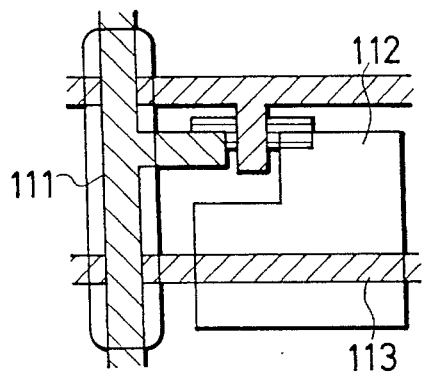

FIG. 12(A-1)
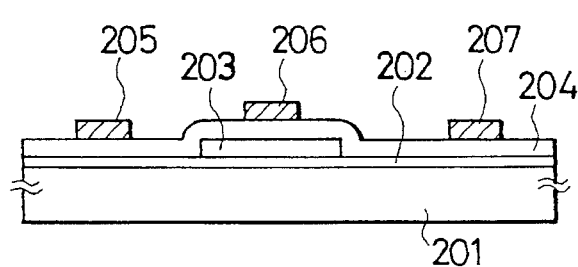
FIG. 12(A-2)
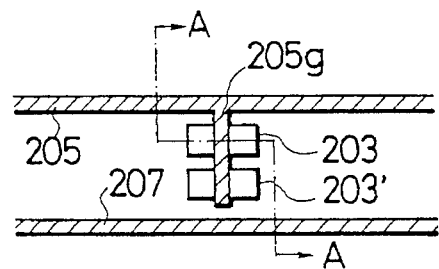
FIG. 12(B-1)
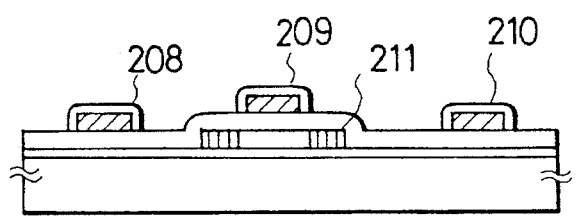
FIG. 12(B-2)
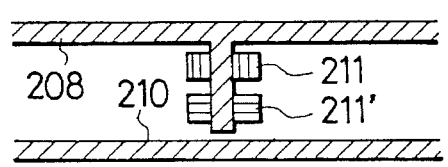
FIG. 12(C-1)
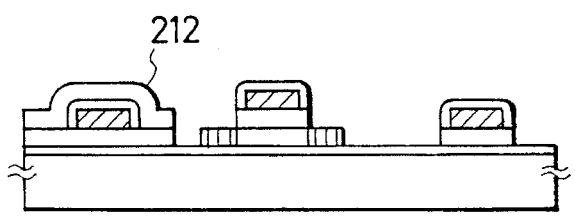
FIG. 12(C-2)
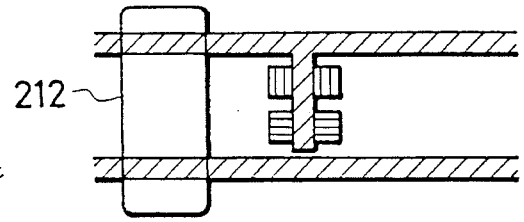
FIG. 12(D-1)
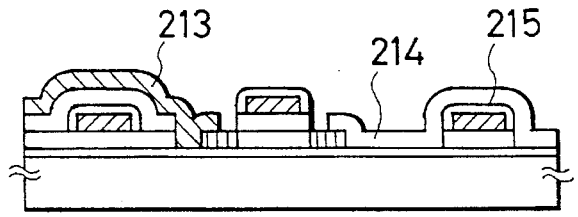
FIG. 12(D-2)
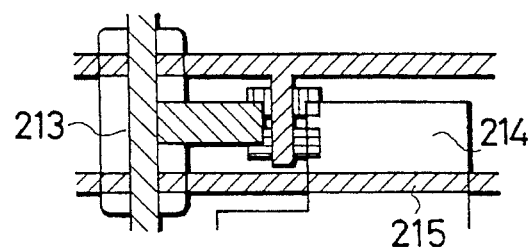

ELECTRO-OPTICAL DEVICE WITH TRANSISTORS AND CAPACITORS METHOD OF DRIVING THE SAME

BACKGROUND OF THE INVENTION

1. Field of the Invention

The present invention relates in general to an electro-optical device and method of forming the same and method of driving the same. More particularly, it relates to such an active matrix type device and a method of manufacturing the same with an appropriate arrangement of driver transistors.

2. Description of the Prior Art

In recent years, the active matrix technique for driving liquid crystal displays has been broadly studied and put in practice. A conventional active matrix circuit comprises thin film transistors (TFT) which control accumulation of electric charge in capacitances formed between respective pixel electrodes and a common opposite electrode with a liquid crystal layer sandwiched therebetween.

Usually, TFTs of only one conductivity type are utilized for constructing the active matrix circuit. Another type active matrix circuit, however, has recently been proposed as described in Japanese Patent Application No. Hei 3-76785 utilizing the so-called modified transfer gate. Such an unaccustomed circuit is employed because the liquid crystal display can operate with a symmetrical driving polarity with the circuit, e.g., as demonstrated in Japanese Patent Application No. Hei 3-208648. Namely, it is difficult for active matrix circuits to realize a symmetrical operation by the use of only one conductivity type.

It is needed for stabilizing image appearing on a display to maintain constant the driving voltage applied across the liquid crystal layer, i.e. the voltages of the respective pixel electrodes with reference to the common opposite electrode with a liquid crystal of the liquid crystal display therebetween. This, however, is difficult for several reasons. The most substantial reason is leakage of electric charge accumulated in the capacitances formed across the liquid crystal layer due to OFF current of the TFTs. There also exists leakage through the capacitance itself. The leakage current through the capacitance, however, is smaller than the leakage current through the TFT turned off by about one order of magnitude. If the leakage current is significant, the image displayed is periodically disturbed in synchronism with vertical scan, i.e. at the frame frequency. Another reason for fluctuation of the voltages ($\Delta V$) across the liquid crystal is coupling of the pixel electrode with the gate signal because of the parasitic capacitance formed between the gate electrode and the pixel electrode.

The fluctuation of the voltages $\Delta V$ across the liquid crystal due to the parasitic capacitance formed between the gate electrode and the pixel electrode is expressed by the equation $$\Delta V = C'V_G/(C_{LC}+C') \qquad (1)$$

where $C'$ is the parasitic capacitance formed between the gate electrode and the pixel electrode, $V_G$ is the gate pulse applied to the gate electrode and $C_{LC}$ is the capacitance across the liquid crystal layer at the pixel. The fluctuation of the voltages $\Delta V$ is theoretically independent from the magnitude or the polarity of signals applied to the data lines, i.e. applied to the sources of the TFTs.

The capacitance $C_{LC}$ may be increased as compared to the capacitance $C'$ in order to solve the problem associated with the fluctuation of the voltages $\Delta V$. This is accomplished by forming source and drain regions in accordance with the self-aligning technique in order to decrease the capacitance $C'$ or by inserting an auxiliary capacitance in parallel to the liquid crystal layer in order to increase the apparent value of the denominator of the above equation. The later solution is illustrated in FIGS. 1(A) and 2(A). The time constant of discharging electric charge from the pixel is increased by provision of such an auxiliary capacitance. The above equation is modified in this case as $$\Delta V = C'V_G/(C_{LC}+C'+C) \qquad (2)$$

where $C$ is the auxiliary capacitance. The fluctuation voltage $\Delta V$ is reduced by selecting $C$ to be relatively large.

The auxiliary capacitances $C$ are formed between the respective pixel electrode and ground lines $X_n'$ extending in parallel to and provided respective for corresponding row lines $X_n$ which supply addressing gate signals to pixels arranged on the rows. This configuration is typically illustrated in FIGS. 1(B) and 2(B). For example, the auxiliary capacitance $C$ is formed by arranging the ground lines $X_n'$ to pass just under the pixel electrode $C_{LC}$ as illustrated with a hatched area in FIG. 3. This structure is described in Japanese Patent Application No. Hei 3-163873. In this case, however, since particular electrode lines (the ground lines $X_n'$) have to be formed in addition, the aperture ratio is then decreased to reduce the brightness of the display.

This shortcoming may be removed by utilizing the row lines $X_n$ also as the ground lines $X_n'$ as illustrated in FIGS. 1(C) and 2(C) in which each pixel electrode overlies the row line $X_{n+1}$ of the next pixel. In this case, since no additional electrode lines are formed, the aperture ratio is not decreased. It is, however, difficult to arrange the pixel electrodes and the row lines in an effective layout and to prevent interference between a respective pixel electrode and the TFT associated with the pixel located just below the electrode. Namely, no effective circuit design and layout has been proposed which can provide a sufficient auxiliary capacitance and a high yield with a high visual performance.

Recently, the use of CMOS transfer gates has been proposed to solve the above problem as discussed, for example, in Japanese Patent Application No. Hei 2-178632. In this case, when a negative pulse and a positive pulse of the same voltage level $V_G$ are applied respectively to the gate electrodes of PMOS and NMOS transistors at the same time, the fluctuation of the voltages ($\Delta V$) across the liquid crystal due to the parasitic capacitances $C_1$ and $C_2$ formed between the gate electrodes and the pixel electrode is expressed by the equation $$\Delta V = (C_1-C_2)V_G/(C_1+C_2+C_{LC}) \qquad (3)$$

where $C_{LC}$ is the capacitance across the liquid crystal layer at the pixel. The fluctuation can be removed by making equal the capacitances $C_1$ and $C_2$. The provision of the two transistors for each pixel also makes possible to operate even if one of the transistors is fault. The fluctuation, however, becomes large in this case if the parasitic capacitance is large. Although the PMOS transistor and the NMOS transistor of adjacent pixels share the same row line, it may be possible to separate lines respectively for supplying gate signals to these transistors as described in Japanese Patent Application No. Hei 2-178632. Of course, the provision of the separate lines reduces the aperture ratio and therefore the brightness.

In general, electric charge leakage takes place through TFTs from the pixel electrodes in active matrix circuits. The leakage has been compensated in prior arts by providing auxiliary capacitances. The transfer gates as illustrated in FIGS. 4(A) and 5(A) are provided with the auxiliary capacitance $C_1$ and $C_2$ in the same manner. In this case, making use of the feature of the transfer gate, the gate (row) lines $X_n$ and $X_n'$ are formed overlapping with the pixel electrode in order to adjust the fluctuation voltage $\Delta V$ at zero by forming the capacitances $C_1$ and $C_2$ to equal each other as illustrated in FIG. 4(B) and FIG. 5(B). It is noted that the gate lines are grounded unless no signal is applied thereto. As a result, it has been expected by employing this fashion to obtain high quality images with a large aperture ratio but without a need for providing particular lines to form the auxiliary capacitances $C_1$ and $C_2$.

It is, however, difficult to make the capacitances $C_1$ and $C_2$ exactly equal when the capacitances $C_1$ and $C_2$ become large. If source and drain regions of a TFT is formed by self-aligning technique, the parasitic capacitance inherently formed between the drain and the gate is usually within 10% of the capacitance associated with the pixel electrode. If two TFTs are formed for one pixel, the difference between the capacitances of the two TFTs can be within 30%. In this case, the fluctuation voltage $\Delta V$ can be limited within about 3% of the gate voltage V since $(C_1-C_2)$ can be limited within about 3% of the capacitance $C_{LC}$ associated with the pixel electrode in Equation (3).

On the other hand, when the capacitance formed between the drain and the gate is enhanced as illustrated in FIG. 4(B) and FIG. 5(B), the enhanced capacitance $C_1$ or $C_2$ is as large as the capacitance $C_{LC}$ associated with the pixel electrode in order to make effective the auxiliary function. Accordingly, even if the difference between the enhanced capacitance $C_1$ and $C_2$ is limited within 10%, $(C_1-C_2)$ becomes about 10 to 20% of the capacitance $C_{LC}$ associated with the pixel electrode in Equation (3). In practice, the fluctuation voltage $\Delta V$ becomes more large since the difference between the enhanced capacitance $C_1$ and $C_2$ usually fluctuates more widely due to variation of the gate width and the overlapping area and since the enhanced capacitance $C_1$ or $C_2$ is usually designed to be 10 or more times as large as the capacitance $C_{LC}$ associated with the pixel electrode.

BRIEF SUMMARY OF THE INVENTION

It is an object of the present invention to provide an improved electro-optical device and a method of manufacturing the same.

It is another object of the present invention to provide an improved electro-optical device consisting of a plurality of pixels which are arranged in an effective layout.

It is another object of the present invention to increase the yield of an electro-optical device.

It is a further object of the present invention to provide an improved electro-optical display capable of displaying highly stabilized images without decreasing the aperture ratio.

Additional objects, advantages and novel features of the present invention will be set forth in the description which follows, and in part will become apparent to those skilled in the art upon examination of the following or may be learned by practice of the present invention. The object and advantages of the invention may be realized and attained by means of the instrumentalities and combinations particularly pointed out in the appended claims.

To achieve the foregoing and other object, and in accordance with the present invention, as embodied and broadly described herein, an electro-optical device comprises a pair of substrates at least one of which is transparent, an electro-optical modulating layer disposed between the substrates, an opposite electrode formed on an inside surface of one of the substrates, a plurality of electrode elements formed on an inside surface of the other of the substrates and arranged in a matrix, a plurality of column conductive lines connected to the electrode elements respectively through transistors and a plurality of row conductive lines connected to the transistors for selectively turning on the transistors respectively by supplying control signals to the transistors through the row conductive lines. Particularly, the electrode elements and the transistors on each column and the odd rows of the matrix are formed in one side of the column conductive line on that column whereas the electrode elements and the transistors on each column and the even rows of the matrix are formed in the other side of the column conductive line on that column. In a preferred embodiment, the row conductive lines on the odd rows are formed extending just under the electrode elements on the even row with a dielectric film therebetween whereas the row conductive lines on the even rows are formed extending just under the electrode elements on the odd row with a dielectric film therebetween. Auxiliary capacitances are formed across the dielectric films.

A typical example of the electro-optical device is a liquid crystal display comprising liquid crystal panel provided with an active matrix circuit including transistors for driving the panel in accordance with the present invention. A plurality of pixels are defined in a matrix in the liquid crystal panel. The pixels on the odd rows and the pixels on the even rows are located in the opposite sides of the column lines through which data signals are supplied. In accordance with the layout of pixel arrangement, row lines can be utilized not only to supply gate signals to the transistors but also to form auxiliary capacitances without a need for providing particular additional lines or bending the row line so that the aperture ratio is not reduced. The auxiliary capacitances are formed independent of the parasitic capacitances formed between the gate and the pixel electrodes, and therefore the auxiliary capacitance C can be increased with the parasitic capacitance C' being limited to a sufficient small value in Equation (2).

A method of driving an electro-optical device of an active matrix in accordance with the present invention comprising:

a first transistor of one of n-type and p-type conductivities connected with a gate line of n-th row; and a second transistor of the other one of the n-type and p-type conductivities connected with a gate line of (n+2)-th row, said method comprises:

applying one of a positive signal and a negative signal to said gate line of (n+2)-th row;

applying the other one of the positive signal and the negative signal to said gate line of n-th row during the application of said one of the positive signal and the negative signal; and applying no signal to a gate line of (n+1)-th row during the application of said one of the positive signal and the negative signal.

BRIEF DESCRIPTION OF THE DRAWINGS

The accompanying drawings, which are incorporated in and form a part of the invention and, together with the description, serve to explain the principles of the invention.

FIGS. 8(A-1) to 8(D-1) are cross sectional views along A—A line of FIG. 8(A-2) showing a method of manufacturing the liquid crystal display provided with the active matrix circuit in accordance with the first embodiment of the present invention.

FIGS. 8(A-2) to 8(D-2) are plan views showing the method of manufacturing the liquid crystal display provided with the active matrix circuit in accordance with the first embodiment of the present invention.

FIGS. 10(A-1) to 10(D-1) are cross sectional views along A—A line of FIG. 10(A-2) showing a method of manufacturing the liquid crystal display provided with the active matrix circuit in accordance with the second embodiment of the present invention.

FIGS. 10(A-2) to 10(D-2) are plan views showing the method of manufacturing the liquid crystal display provided with the active matrix circuit in accordance with the second embodiment of the present invention.

FIGS. 12(A-1) to 12(D-1) are cross sectional views along A—A line of FIG. 12(A-2) showing a method of manufacturing the liquid crystal display provided with the active matrix circuit in accordance with the third embodiment of the present invention.

FIGS. 12(A-2) to 12(D-2) are plan views showing the method of manufacturing the liquid crystal display provided with the active matrix circuit in accordance with the third embodiment of the present invention.

DETAILED DESCRIPTION OF THE PREFERRED EMBODIMENTS

Figure 6A:
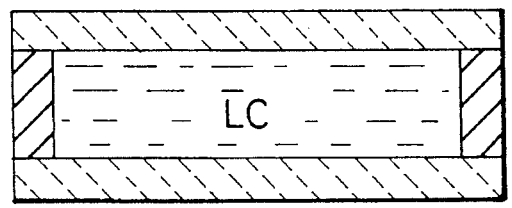
FIGS. 6(A) to 6(C) are a cross sectional view, a circuit diagram and a plan view showing a liquid crystal display provided with an active matrix circuit in accordance with a first embodiment of the present invention.
Figure 6B:
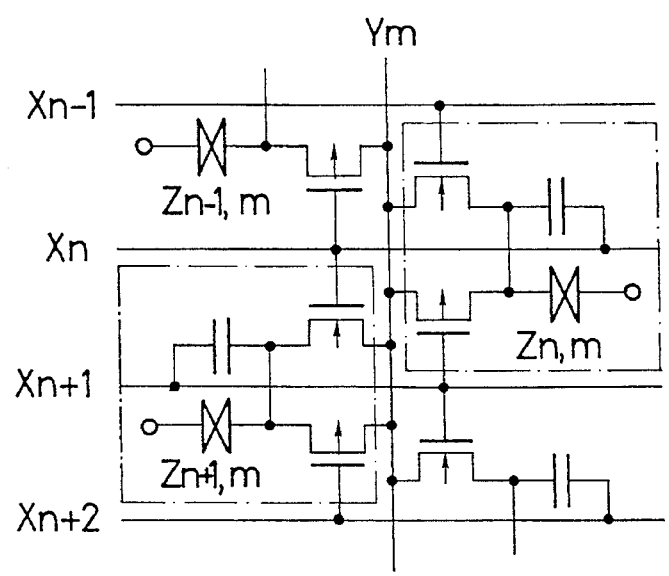
Figure 6C:
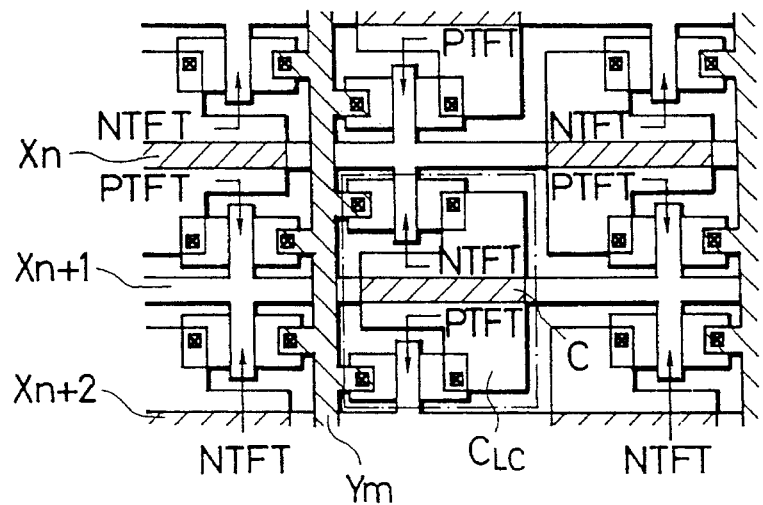

Referring now to FIGS. 6(A) to 6(C), a liquid crystal display provided with an active matrix circuit in accordance with a first embodiment of the present invention will be explained. The active matrix circuit is formed on the inside surface of one of a pair of transparent substrates such as glass substrates between which a liquid crystal material is disposed as illustrated in FIG. 6(A). The liquid crystal material is, for example, a twisted nematic liquid crystal material or a super-twisted nematic liquid crystal material. The inside surface of the other substrate is formed with an opposite common electrode which are grounded. Although not specifically illustrated in FIG. 6(A), a plurality of pixel electrodes (pads) are formed and arranged in a matrix on the active matrix circuit opposite to the common electrode with the liquid crystal material inbetween. A desired image can be constructed by setting voltage levels at the respective pixel electrodes with the opposing common electrode being grounded.

FIG. 6(B) illustrates a circuit diagram of the active matrix circuit. The circuit comprises a plurality of column lines $Y_m$ (only one of which is illustrated) and a plurality of row lines $X_n$ (only four illustrated). The column lines are data lines $Y_m$ through which are supplied data signals indicative of an image to be displayed. The row lines are addressing gate lines $X_n$ to designate one of the rows corresponding to the data signals applied to the column lines. Chain line in the figure encloses the region of one pixel. In each pixel, the pixel electrode is connected to the corresponding data line $Y_m$ through CMOS thin film transistors of PMOS and NMOS FETs (field effect transistors). As illustrated in FIG. 6(B), the drains of the NMOS FETs and the sources of the PMOS FETs are connected to the column lines while the gates of both the FETs are connected respectively to the row lines (gate lines). The pixel electrode for pixel $Z_{n,m}$ on the n-th row and the m-th column is driven by addressing signals of opposite levels on the gate lines $X_{n-1}$ and $X_{n+1}$ whereas the line $X_n$ passes through the pixel $Z_{n,m}$ to form an auxiliary capacitance between it and the pixel electrode. Namely, when driving pulses are given to the FETs to turn on the same, voltage levels on the column lines are transferred to the pixel electrodes through the FETs.

Figure 1A:
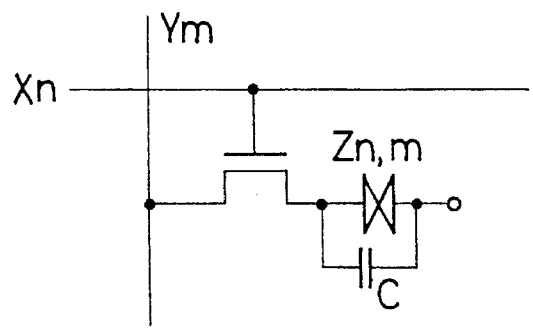
FIGS. 1(A) to 1(C) are circuit diagrams showing prior art active matrix circuits.
Figure 1B:
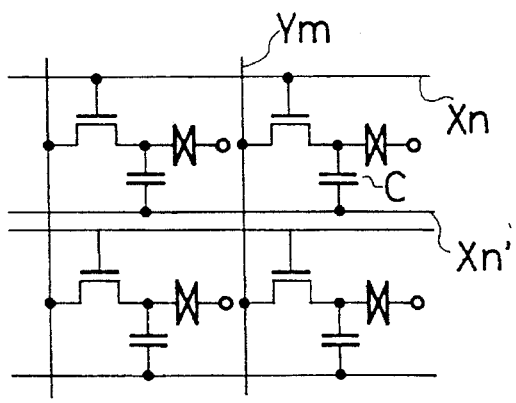
Figure 1C:
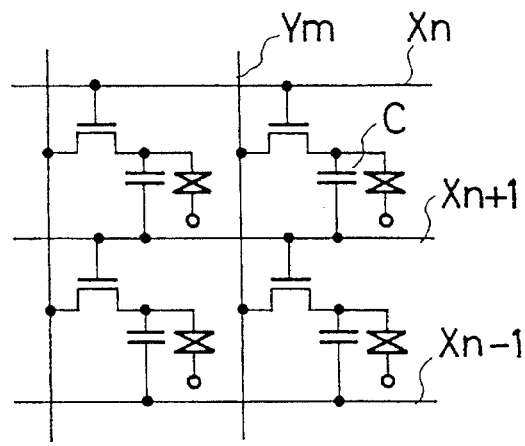
Figure 5A:
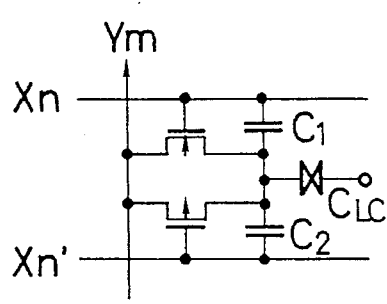
FIGS. 5(A) and 5(B) are a circuit diagram and a plan view showing a prior art active matrix circuit.
Figure 5B:
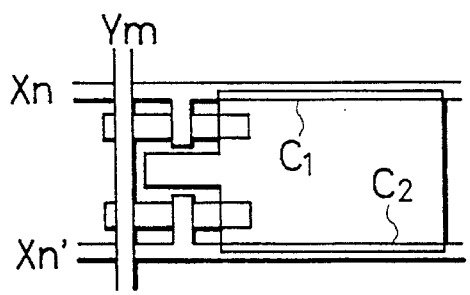

FIG. 6(C) illustrates a plan view showing the layout of the respective elements of the electrode pattern and the transistors. As shown in the figure, addressing row lines $X_n$, $X_{n+2}$, . . . for odd rows are formed to supply addressing gate signals in the right side of the data lines $Y_m$ and pass under pixel electrodes of even rows whereas addressing row lines $X_{n-1}$, $X_{n+1}$, . . . for even rows are formed to supply addressing gate signals in the left side of the data lines $Y_m$ and pass under pixel electrodes of odd rows. Namely, pixel electrodes on each column are arranged alternately in the right and left sides of the column line $Y_m$. The auxiliary capacitances are formed in the hatched areas in the figure. Namely, since each row line $X_n$ simply passes under the corresponding pixel electrode and is utilized only in the opposite side of the data line to drive adjacent pixels, the auxiliary capacitance is easily increased without increasing parasitic capacitance between the gate and the pixel electrode. As understood from FIGS. 6(B) and 6(C), there is formed no additional line as compared to FIGS. 5(A) and 5(B). This layout fascilitates hexagonal arrangement of pixels which improves mixture of RGB color elements. The hexagonal arrangement is easily realized without a need for designing curved lines which can not easily be manufactured with a high yield.

Figure 7A:
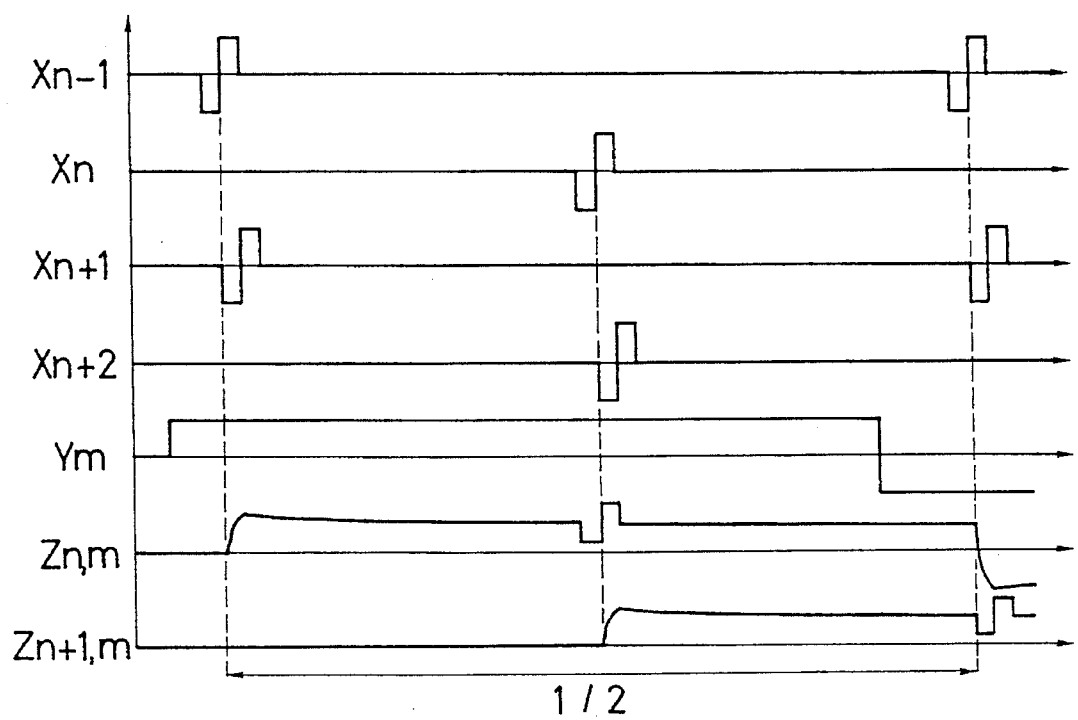
FIGS. 7(A) and 7(B) are graphic diagrams showing a method of driving the liquid crystal display provided with the active matrix circuit in accordance with the first embodiment of the present invention.

A method of driving the active matrix circuit illustrated in FIG. 6(B) will be explained with reference to FIG. 7(A). The display is assumed to have 480 rows scanned within each frame of 30 milliseconds. A negative pulse and a positive pulse (bipolar pulses) are applied in sequence with no interval to each gate line within ½ frame. Within first ¼ frame, odd rows are scanned by applying the pair of negative and positive pulses in succession to respective row lines with displacement of the pulse width as illustrated in FIG. 7(A). The pulse width is 62.5 microseconds in this case. For example, the n-th row is addressed by a positive pulse applied to the row line $X_{n-1}$ (i.e. the gate of the NMOS FET) and a negative pulse to the row line $X_{n+1}$ (i.e. the gate of the PMOS FET) as illustrated. The signal level at the corresponding data line $Y_m$ is then transferred to the corresponding pixel electrode. The signal level is zero or an appropriate positive level, e.g. 5V in this case. The next (n+2)-th row is addressed by a positive pulse applied to the row line $X_{n+1}$ and a negative pulse to the row line $X_{n+3}$. When all the odd rows are scanned, the remaining even rows are scanned by applying the pair of negative and positive pulses in succession to respective row lines with displacement of the pulse width in the same manner. This scanning is similar to the so-called interlaced scanning. For example, the (n+1)-th row is addressed by a positive pulse applied to the row line $X_n$ and a negative pulse to the row line $X_{n+2}$ as illustrated. The next (n+3)-th row is addressed by a positive pulse applied to the row line $X_{n+2}$ and a negative pulse to the row line $X_{n+4}$. The same procedure is repeated within the next ½ frame to address all the even rows. The signal level, however, is zero or an appropriate negative level, e.g. −5V in this case.

In this case, since a positive pulse is applied to the PMOS transistors of pixels on the n-th row just to address the next (n+2)-th row after positive and negative pulses are applied respectively to the NMOS and PMOS transistors on the n-th row in order to address the next row, the voltage levels at the pixel electrodes fluctuate due to the parasitic capacitances between the pixel electrodes and the gate electrodes. The fluctuation, however, is very small and negligible because the parasitic capacitance may be designed as small as possible. On the other hand, the fluctuation due to positive and negative pulses applied to the row line $X_n$ extending just under the pixel electrode on the n-th row is relatively large as compared to the fluctuation due to the parasitic capacitance. The fluctuation due to the positive and negative pulse, however, are limited respectively to only twice the pulse width (62.5 microseconds×2) and quickly cancel each other out as illustrated in FIG. 7(A) resulting in little damage on images as displayed. The above description is made in accordance with a simplified theoretical case for facilitating understanding. In practice, it may be appropriate to interpose suitable intervals between adjacent pulses in order to avoid interference between pulses applied to different row lines.

Figure 7B:
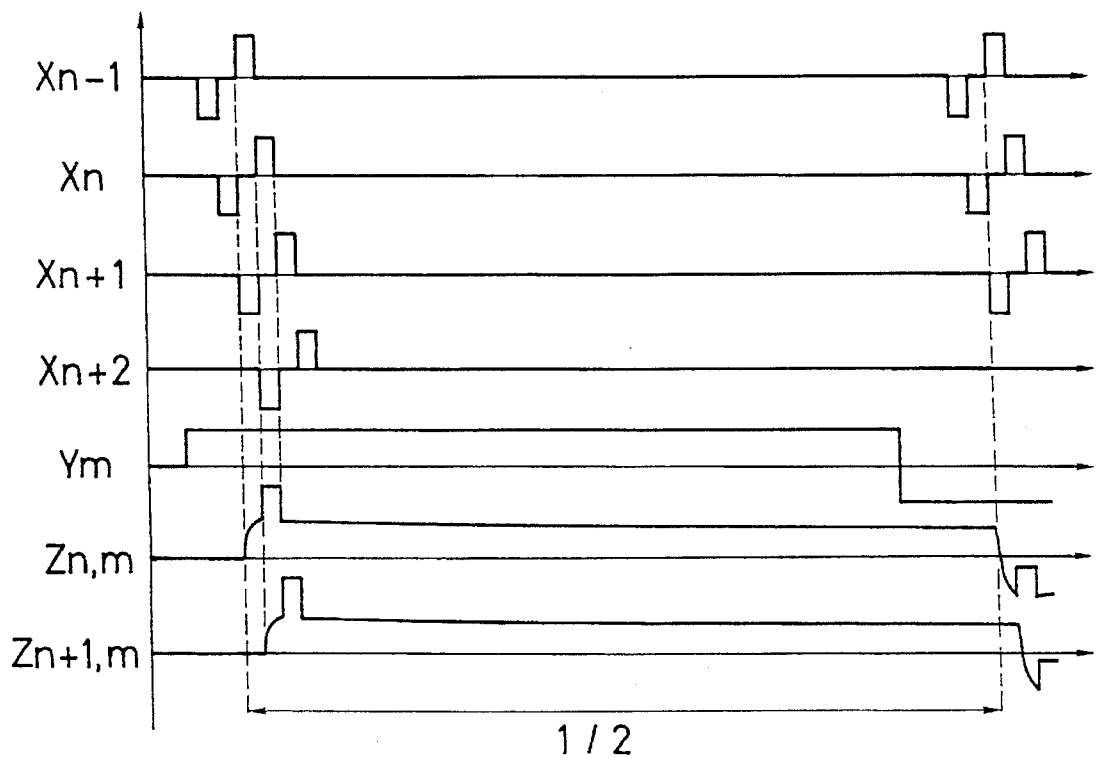

Another method of driving the active matrix circuit illustrated in FIG. 6(B) will be explained with reference to FIG. 7(B). In this case, the rows are scanned exactly in the order of from upper row to lower row. Namely, after addressing the n-th row by applying a positive pulse to the row line $X_{n-1}$ and a negative pulse to the row line $X_{n+1}$, the (n+1)-th row is addressed by applying a positive pulse to the row line $X_n$ and a negative pulse to the row line $X_{n+2}$. The other rows are addressed in sequence in the same manner within the initial ½ frame. The signal level on the lines $Y_m$ are zero or an appropriate positive level, e.g. 5V in this case. The same procedure is repeated within the next ½ frame while the signal levels on the lines $Y_m$ are zero or an appropriate negative level. As seen from each row line, a positive pulse is applied after application of a negative pulse with an interval time of one pulse width, unlike the method illustrated in FIG. 6(A) where no interval is interposed therebetween. This scanning is similar to the so-called non-interlaced scanning. Pulses applied to the n-th row influences the pixels on the n-th row. The influence, however, is negligible for the same reason as the above method.

Referring now to FIGS. 8(A-1) to 8(D-1) and FIGS. 8(A-2) to 8(D-2), a method of manufacturing the active matrix circuit in accordance with the first embodiment of the present invention will be explained.

An insulating film 2 is coated over a glass substrate 1. The insulating film 2 is made of, for example, silicon dioxide or silicon nitride. A plurality of semiconductor islands 3 are formed on the insulating film 2 in order to form active regions in the same manner as a usual conventional technique. Another insulating film 4 is coated on the substrate to cover the semiconductor islands. The insulating film 4 is made of silicon dioxide. A plurality of row lines 6 and 7 are formed from aluminum. The row lines 6 extend along the semiconductor islands 3 and provided with projections 6g functioning as gate electrode on the semiconductor islands 3. The external surfaces of the aluminum lines 6 and 7 are anodic oxidized in order to form aluminum oxide films 8 of 350 nm thickness. With the row lines 6 as a mask, source and drain regions 10 are formed by ion implantation in a self-aligning fashion in accordance with a known CMOS technique. An insulating film 11 is then coated over the structure to a thickness of 500 nm. The silicon oxide film 4 and the insulating film 11 are then partially removed in order to leave only a portion functioning as gate insulating films just under the gate electrodes and a portion functioning as interlayer insulating films 11a, 11b and 11c over the row lines 6 and 7 where a column line is to be passed over. This removal is carried out with the gate electrode as a mask and additional suitable masks on the interlayer insulating films 11a, 11b and 11c by the use of a buffered hydrofluoric acid in a self-aligning fashion. In this case, since aluminum oxide has a sufficient resistance to corrosion by the etchant, there is no need for providing a particular mask on the aluminum pattern. The source and drain regions are exposed by this etching and therefore it is possible to dispense with formation of particular contact holes, which otherwise would have to be formed by finely aligning masks on the structure, and to prevent the yield from decreasing due to inevitable misalignment of contact holes. A plurality of column lines (data lines) 12 (only one being illustrated) are then formed on the substrate to pass over the interlayer insulating films 11a, 11b and 11c and make electric contact with the semiconductor islands 3 of the CMOS transistors through projections as illustrated in FIGS. 8(D-1) and 8(D-2). The column lines 12 are made of aluminum or chromium. Finally, a pixel electrode 14 is formed from indium tin oxide to make electric contact with the semiconductor islands as illustrated. Electrode pads 13 and 13' may be formed at the same time as the column electrodes 12 are formed in order to make easy to form the pixel electrodes 14 in contact with the semiconductor islands therethrough.

In this case, since the pixel electrodes 14 are formed on the row lines with the thin aluminum oxide films therebetween which have a sufficient dielectric constant approximately twice as high as that of usual silicon oxide, a large auxiliary capacitance can be formed therebetween. On the other hand, signal delay is effectively suppressed since the capacitances formed at intersections between the row lines and the column lines are reduced by interposing the silicon oxide film of 500 nm thickness therebetween. Details of process conditions of the method set forth above are described, for example, in Japanese Patent Applications Nos. Hei 3-273377, Hei 4-30220 and Hei 4-38637, all of which are fully incorporated herein by this reference. As shown in FIG. 8(D-2), an electro-optical device in accordance with the present invention comprises:

a gate line of n-th row connected with one transistor;

a gate line of (n+1)-th row adjacent to said gate line of n-th row;

a gate line of (n+2)-th row being adjacent to said gate line of (n+1)-th row and connected with another transistor;

a pixel electrode connected with said one transistor and said another transistor; and a capacitor comprising said pixel electrode, said gate line of (n+1)-th row, and an insulator provided between said pixel electrode and said gate line of (n+1)-th row.

At least one of said one transistor and said another transistor has n-type conductivity. For example, said one transistor has one of p-type and n-type conductivities, and said another transistor has the other one of the p-type and n-type conductivities by the CMOS technique. The pixel electrode is connected with one of source and drain of each of said one transistor and said another transistor as shown in FIG. 8(D-2).

Figure 9A:
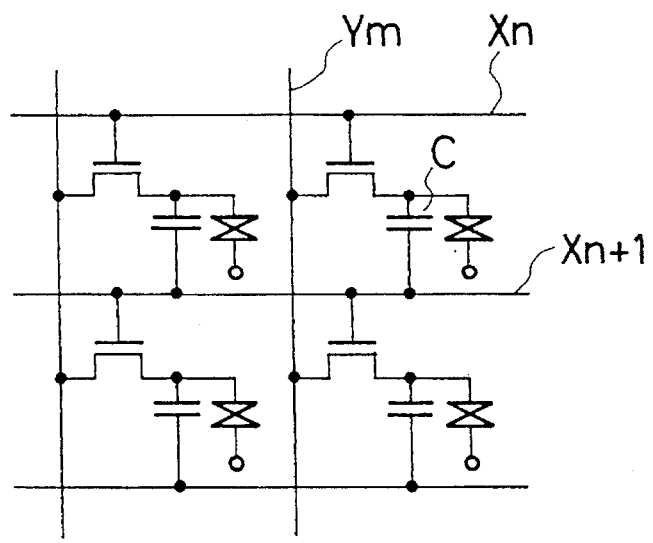
FIGS. 9(A) and 9(B) are a circuit diagram and a plan view showing an active matrix circuit in accordance with a second embodiment of the present invention.
Figure 9B:
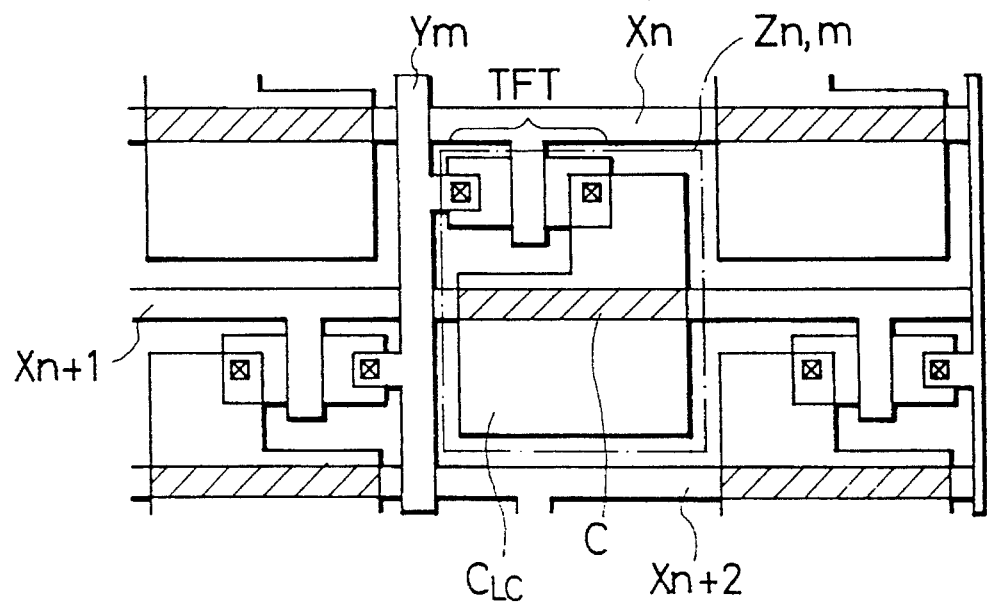

Referring now to FIGS. 9(A) and 9(B), a liquid crystal display provided with an active matrix circuit in accordance with a second embodiment of the present invention will be explained. FIG. 9(A) illustrates a circuit diagram of the active matrix circuit. The circuit comprises a plurality of column lines $Y_m$ and a plurality of row lines $X_n$. The column lines are data lines $Y_m$ through which are supplied data signals indicative of an image to be displayed. The row lines are addressing gate lines $X_n$ to address one of the rows corresponding to the data signals applied to the column lines. In each pixel, the pixel electrode is connected to the corresponding data line $Y_m$ through an NMOS FET. As illustrated in FIG. 9(B), the pixel electrode for pixel $Z_{n,m}$ on the n-th row and the m-th column is driven by supplying an addressing signal to the gate line $X_n$ with the column line $Y_m$ set at data to be displayed at the pixel $Z_{n,m}$.

FIG. 9(B) illustrates a plan view showing the layout of the respective elements of the electrode pattern and the transistors. Chain line in the figure encloses the region of one pixel. As shown in the figure, addressing row lines $X_n$, $X_{n+2}$, ... for odd rows are formed to supply addressing gate signals in the right side of the data lines $Y_m$ and pass under pixel electrodes of even rows whereas addressing row lines $X_{n-1}$, $X_{n+1}$, ... for even rows are formed to supply addressing gate signals in the left side of the data lines $Y_m$ and pass under pixel electrodes of odd rows in the right side. Namely, pixel electrodes on each column are arranged alternately in the right and left sides of the column line $Y_m$. The auxiliary capacitances are formed in the hatched areas in the figure whereas row lines $X_n$, $X_{n+1}$, ... pass respectively through the adjacent pixel electrodes with a suitable insulating film therebetween without a need for bending the row line. Namely, since each row line $X_n$ is connected to the corresponding pixel electrode and simply passes under the adjacent pixel electrode, the auxiliary capacitance is easily increased without increasing parasitic capacitance between the gate and the pixel electrode. As understood from FIGS. 9(A) and 9(B), there is formed no additional line as compared to FIGS. 5(A) and 5(B). This layout fascilitates hexagonal arrangement of pixels which improves mixture of RGB color elements in the same manner as the first embodiment. An electro-optical device in accordance with the present invention comprises:

a first gate line;

one pixel electrode connected with said first gate line through a transistor;

a second gate line being adjacent to said first gate line and connected with another pixel electrode through another transistor;

a data line provided between said one pixel electrode and said another pixel electrode; and a capacitor comprising said one pixel electrode, said second gate line, and an insulator provided between said one pixel electrode and said second gate line.

Figure 11A:
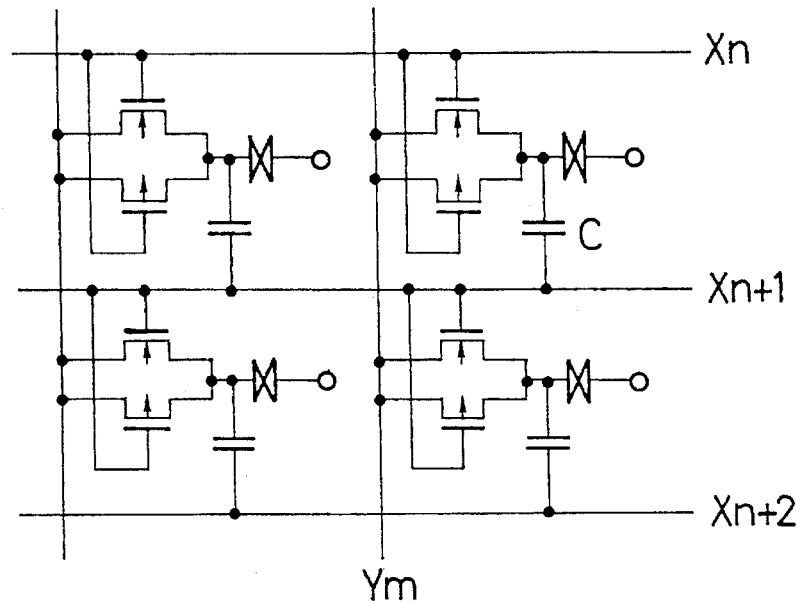
FIGS. 11(A) and 11(B) are a circuit diagram and a plan view showing an active matrix circuit in accordance with a third embodiment of the present invention.
Figure 11B:
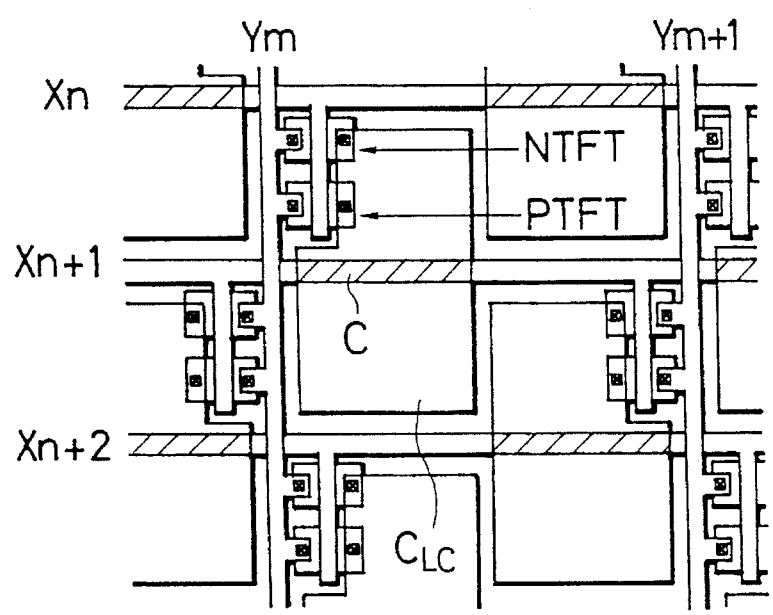

Said one pixel electrode may be connected with the first gate line through a p-channel transistor and an n-channel transistor, and said second gate line may be connected with said another pixel electrode through another p-channel transistor and another n-channel transistor as shown in FIG. 11(B). Said one pixel electrode may be connected with the first gate line through an n-channel transistor and connected with a third gate line through a p-channel transistor, and said another pixel electrode may be connected with the second gate line through another n-channel transistor and connected with a fourth gate line through another p-channel transistor as shown in FIG. 6(C). surfaces of said first gate line and said second gate line may be covered with an anodic oxide.

Referring now to FIGS. 10(A-1) to 10(D-1) and FIGS. 10(A-2) to 10(D-2), a method of manufacturing the active matrix circuit in accordance with the second embodiment of the present invention will be explained.

An insulating film 102 is coated over a glass substrate 101. The insulating film 102 is made of, for example, silicon dioxide or silicon nitride. A plurality of semiconductor islands 103 (only one being illustrated) are formed on the insulating film 102 in order to form active regions in the same manner as a usual conventional technique. Another insulating film 104 is coated on the substrate to cover the semiconductor islands. The insulating film 104 is made of silicon dioxide. A plurality of row lines 105 and 106 are formed from aluminum. The row lines 105 extend along the semiconductor islands 103 and provided with projections 105g functioning as gate electrodes on the semiconductor islands 103. The external surfaces of the aluminum lines 105 and 106 are anodic oxidized in order to form aluminum oxide films 107 and 108 of 350 nm thickness. With the row lines 105 as a mask, source and drain regions 109 of an n-type are formed by ion implantation in a self-aligning fashion in accordance with a known technique. An insulating film is then coated over the structure to a thickness of 500 nm. The silicon oxide film 104 and the insulating film are then partially removed in order to leave only a portion functioning as gate insulating films just under the gate electrodes and a portion functioning as interlayer insulating films 110 over the row lines 105 and 106 where a column line is to be passed over as designated by numeral 110 in FIG. 10(C-2). This removal is carried out with the gate electrodes as a mask and additional suitable masks on the interlayer insulating film 110 by the use of a buffered hydrofluoric acid in a self-aligning fashion. In this case, since aluminum oxide has a sufficient resistance to corrosion by the etchant, there is no need for providing a particular mask on the aluminum pattern. The source and drain regions are exposed by this etching and therefore it is possible to dispense with formation of particular contact holes, which otherwise would have to be formed by finely aligning masks on the structure, and to prevent the yield from decreasing due to inevitable misalignment of the contact holes. A plurality of column lines 111 (only one being illustrated) are then formed on the substrate to pass over the interlayer insulating films 110 and make electric contact with the semiconductor islands 103 through projections as illustrated in FIGS. 10(D-1) and 10(D-2). The column lines 111 are made of aluminum or chromium. Finally, a pixel electrode 112 is formed from indium tin oxide to make electric contact with the semiconductor islands as illustrated. In this case, since the pixel electrodes 112 are formed on the row lines 113 with the thin aluminum oxide films therebetween which have a sufficient dielectric constant approximately twice as high as that of usual silicon oxide, a large auxiliary capacitance can be formed therebetween in the same manner as the first embodiment.

If more large capacitances are desired as the auxiliary capacitance, the gate electrode may be formed of tantalum or titanium followed by anodic oxidation thereof to utilize the oxide of tantalum or titanium as the dielectric material. Of course, customary techniques can be employed to form the auxiliary capacitance, for example, by depositing an oxide film such as silicon oxide or silicon nitride by CVD or sputtering on the gate electrode made of a metallic material followed by formation of the pixel electrode therein.

Referring now to FIGS. 11(A) and 11(B), a liquid crystal display provided with an active matrix circuit in accordance with a third embodiment of the present invention will be explained. FIG. 11(A) illustrates a circuit diagram of the active matrix circuit. FIG. 11(B) illustrates a corresponding plan view of the active matrix circuit. The circuit comprises a plurality of column lines $Y_m$, $Y_{m+1}$, . . . and a plurality of row lines $X_n$. The column lines are data lines $Y_m$, $Y_{m+1}$, . . . through which are supplied data signals indicative of an image to be displayed. The row lines are addressing gate lines $X_n$, $X_{n+1}$, . . . to address one of the rows corresponding to the data signals applied to the column lines. In each pixel, the pixel electrode is connected to the corresponding data line $Y_m$ through CMOS transistor consisting of NFET and PFET. As illustrated in FIG. 11(B), the pixel electrode for pixel on the n-th row and the m-th column is driven by supplying an addressing signal to the gate line $X_n$ with the column line $Y_m$, $Y_{m+1}$, . . . set at data to be displayed at the pixel.

Figure 2A:
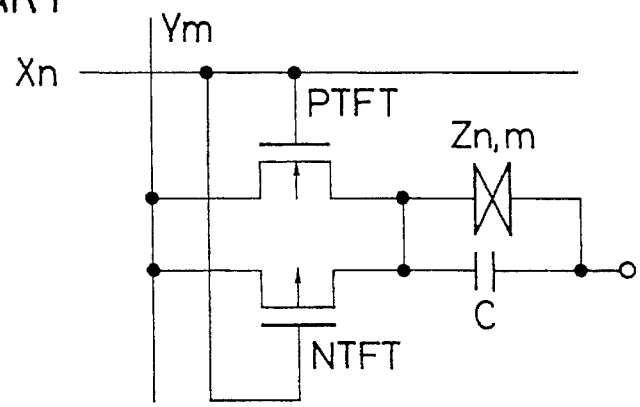
FIGS. 2(A) to 2(C) are circuit diagrams showing prior art active matrix circuits of another type.
Figure 2B:
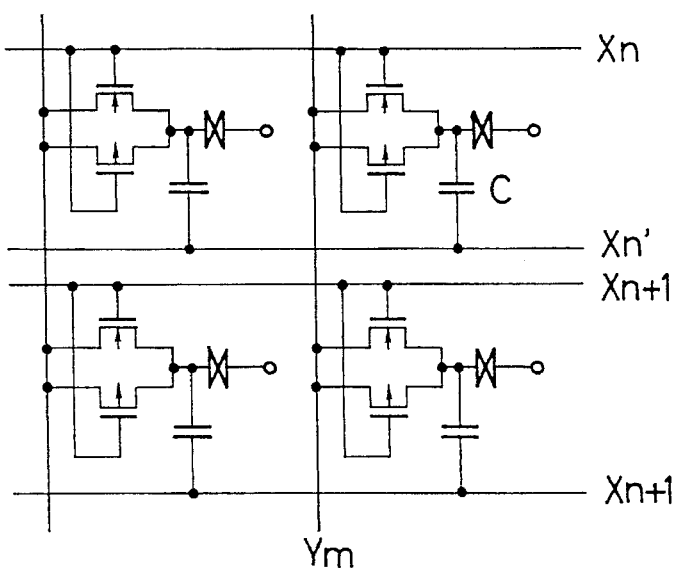
Figure 2C:
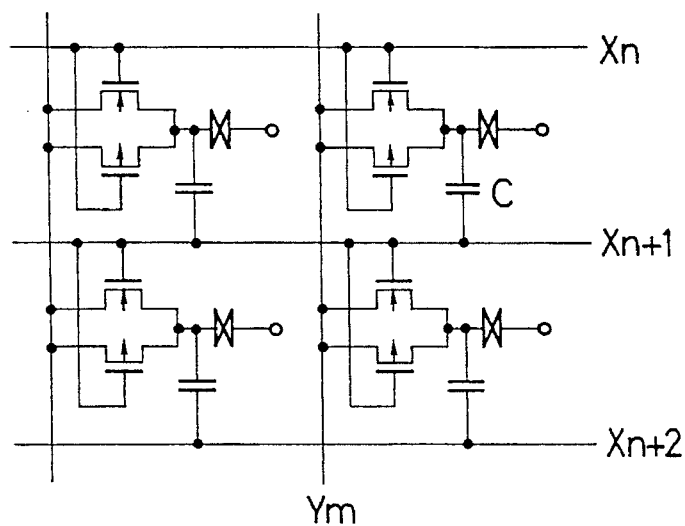
Figure 3:
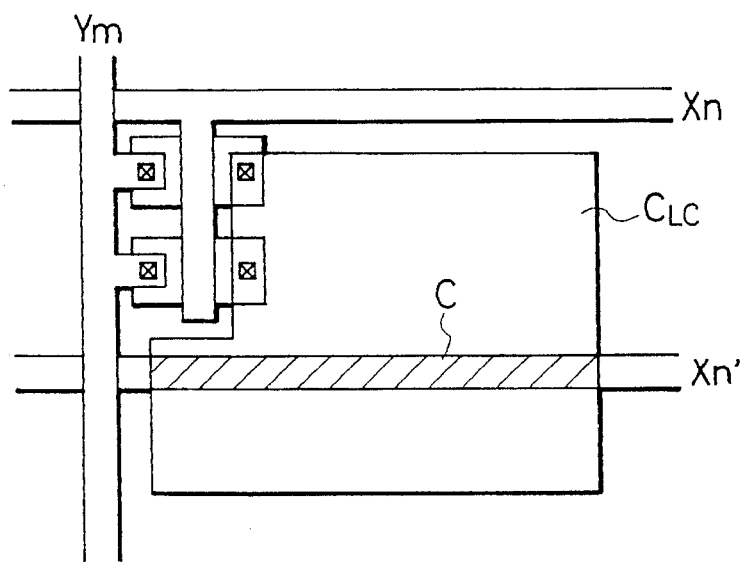
FIG. 3 is a plan view showing the layout of a prior art active matrix circuit provided with an auxiliary capacitance.
Figure 4A:
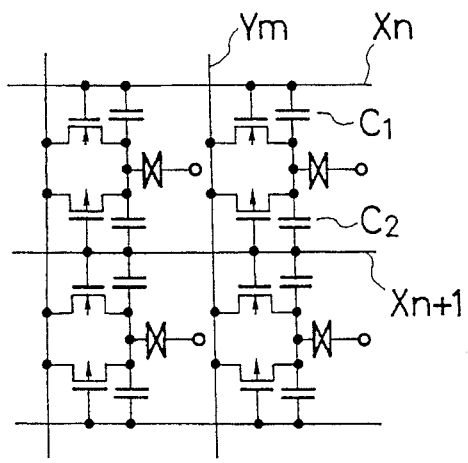
FIGS. 4(A) and 4(B) are a circuit diagram and a plan view showing a prior art active matrix circuit.
Figure 4B:
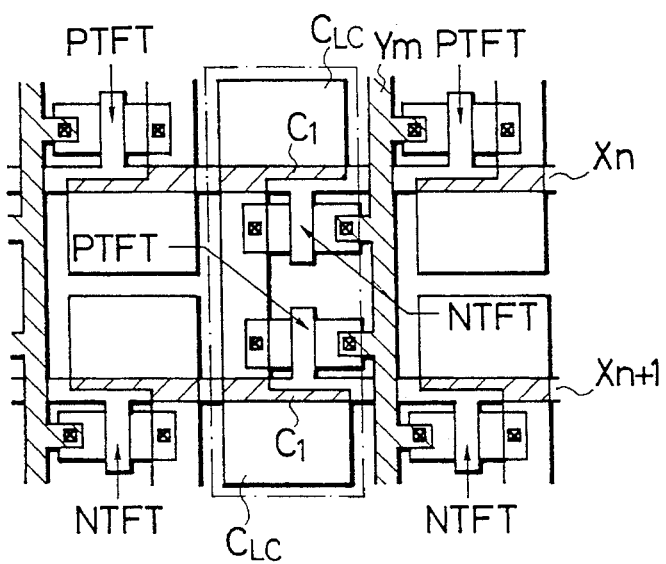

FIG. 11(B) illustrates a plan view showing the layout of the respective elements of the electrode pattern and the transistors. As shown in the figure, addressing row lines $X_n$, $X_{n+2}$, . . . for odd rows are formed to supply addressing gate signals in the right side of the data lines $Y_m$ and pass under pixel electrodes of even rows whereas addressing row lines $X_{n+1}$, . . . for even rows are formed to supply addressing gate signals in the left side of the data lines $Y_m$ and pass under pixel electrodes of odd rows in the right side. Namely, pixel electrodes on each column are arranged alternately in the right and left sides of the column line $Y_m$. The auxiliary capacitances are formed in the hatched areas in the figure whereas row lines $X_n$, $X_{n+1}$, . . . pass respectively through the adjacent pixel electrodes with a suitable insulating film therebetween without a need for bending the row line. Namely, since each row line is connected to the corresponding pixel electrode and simply passes under the adjacent pixel electrode in the opposite side of the column line $Y_m$, the auxiliary capacitance is easily increased without increasing parasitic capacitance between the gate and the pixel electrode. As understood from FIGS. 11(A) and 11(B), there is formed no additional line as compared to FIGS. 2(B). This layout facilitates hexagonal arrangement of pixels which improves mixture of RGB color elements in the same manner as the first embodiment. An electro-optical device in accordance with the present invention comprises:

a first n-type transistor connected with a data line and a gate line of n-th row;

a second p-type transistor connected with said data line and said gate line of n-th row;

a third n-type transistor connected with said data line and a gate line of (n−1)-th row adjacent to said gate line of n-th row; and a fourth p-type transistor connected with said data line and said gate line of (n−1)-th row, wherein said third transistor and said fourth transistor are provided on a side of said data line opposite to said first transistor and said second transistor.

Referring now to FIGS. 12(A-1) to 12(D-1) and FIGS. 12(A-2) to 12(D-2), a method of manufacturing the active matrix circuit in accordance with the third embodiment of the present invention will be explained.

An insulating film 202 is coated over a glass substrate 201. The insulating film 202 is made of, for example, silicon dioxide or silicon nitride. A plurality of semiconductor islands 203 (only two being illustrated) are formed on the insulating film 202 in order to form active regions for NMOS and PMOS transistors 203 and 203' in the same manner as a usual conventional technique. Another insulating film 204 is coated on the substrate to cover the semiconductor islands. The insulating film 204 is made of silicon dioxide. A plurality of row lines 205 and 207 are formed from aluminum. The row lines 205 extend along the semiconductor islands 203 and provided with projections 205g functioning as gate electrodes on the semiconductor islands 203. The external surfaces of the aluminum lines 205 and 207 are anodic oxidized in order to form aluminum oxide films 208, 209 and 210 of 350 nm thickness. With the row lines 206 as a mask, source and drain regions 211 are formed by ion implantation in a self-aligning fashion in accordance with a known technique. An insulating film is then coated over the structure to a thickness of 500 nm. The silicon oxide film 204 and the insulating film are then partially removed in order to leave only a portion functioning as gate insulating films just under the gate electrodes and a portion functioning as interlayer insulating films 212 over the row lines 205 and 207 where a column line is to be passed over as designated by numeral 212 in FIG. 12(C-2). This removal is carried out with the gate electrodes as a mask and additional suitable masks on the interlayer insulating film 212 by the use of a buffered hydrofluoric acid in a self-aligning fashion. In this case, since aluminum oxide has a sufficient resistance to corrosion by the etchant, there is no need for providing a particular mask on the aluminum pattern. The source and drain regions are exposed by this etching and therefore it is possible to dispense with formation of particular contact holes, which otherwise would have to be formed by finely aligning masks on the structure, and to prevent the yield from decreasing due to inevitable misalignment of the contact holes. A plurality of column lines 213 (only one being illustrated) are then formed on the substrate to pass over the interlayer insulating films 213 and make electric contact with the semiconductor islands 203 through projections as illustrated in FIGS. 12(D-1) and 12(D-2). The column lines 213 are made of aluminum or chromium. Finally, a pixel electrode 214 is formed from indium tin oxide to make electric contact with the semiconductor islands as illustrated. In this case, since the pixel electrodes 214 are formed on the row lines 207 with the thin aluminum oxide films therebetween which have a sufficient dielectric constant approximately twice as high as that of usual silicon oxide, a large auxiliary capacitance can be formed therebetween in the same manner as the first embodiment. Suitable electrode pads may be formed at the same time as the column electrodes 213 are formed in order to make easy to form the pixel electrodes 214 in contact with the semiconductor islands therethrough.

Figure 13A:
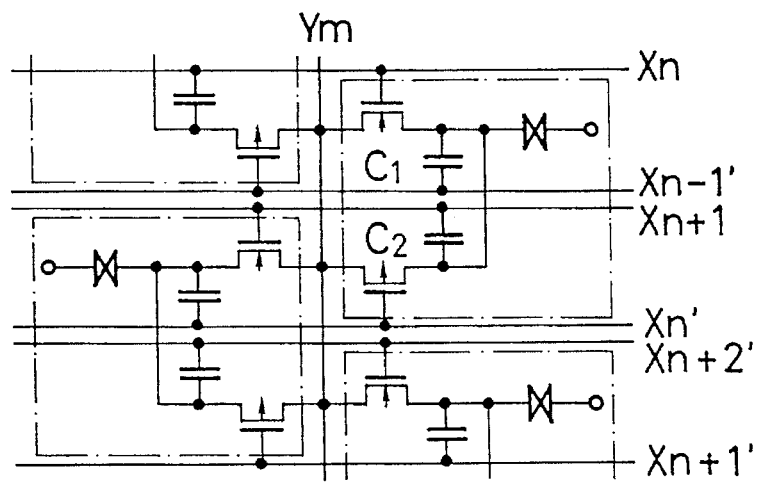
FIGS. 13(A) and 13(B) are a circuit diagram and a plan view showing an active matrix circuit in accordance with a fourth embodiment of the present invention.
Figure 13B:
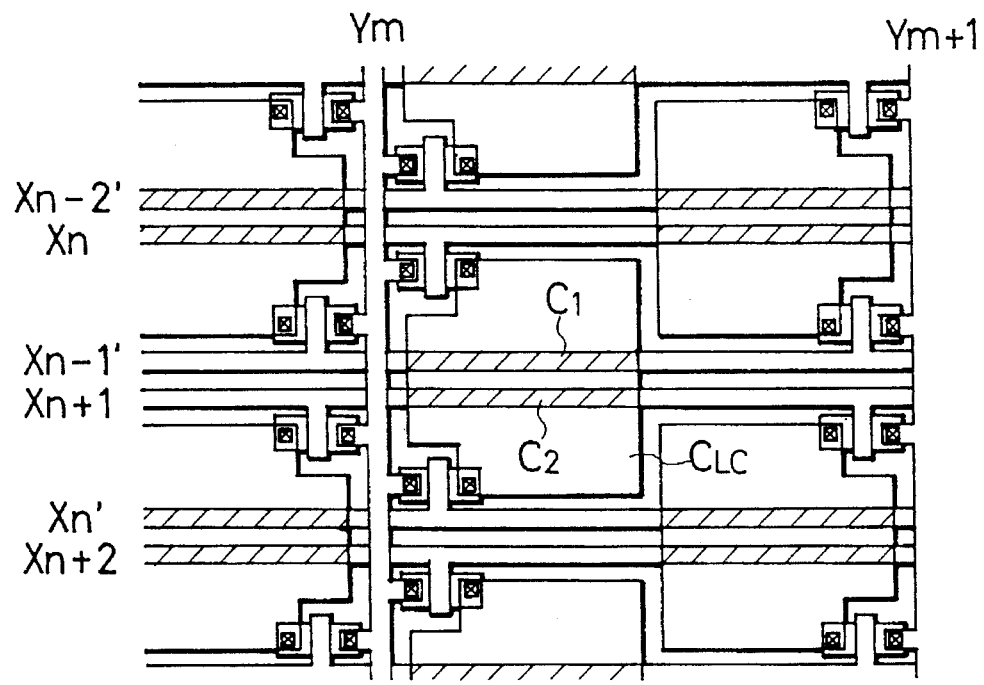

Referring now to FIGS. 13(A) and 13(B), a liquid crystal display provided with an active matrix circuit in accordance with a fourth embodiment of the present invention will be explained.

FIG. 13(A) illustrates a circuit diagram of the active matrix circuit. FIG. 13(B) illustrates a corresponding plan view of the active matrix circuit. The circuit comprises a plurality of column lines $Y_m$ (only one of which is illustrated) and a plurality of row lines $X_n$, $X_{n+1}$, $X_{n+2}$, ... and $X_{n-2}'$, $X_{n-1}'$, $X_{n-2}'$, .... One pixel is schematically enclosed by chain line. The column lines are data lines $Y_m$ through which are supplied data signals indicative of an image to be displayed. The row lines are addressing gate lines $X_n$ and $X_n'$ to designate one of the rows corresponding to the data signals applied to the column lines. In each pixel, the pixel electrode is connected to the corresponding data line $Y_m$ through CMOS transistors of PMOS and NMOS FETs. As illustrated in FIG. 13(A), the pixel electrode for the pixel on the n-th row and the m-th column is driven by addressing signals of opposite levels on the gate lines $X_n$ and $X_n'$ whereas the lines $X_{n-1}'$ and $X_{n+1}$ pass through that pixel under the pixel electrode to form an auxiliary capacitance between them and the pixel electrode.

FIG. 13(B) illustrates a plan view showing the layout of the respective elements of the electrode pattern and the transistors. As shown in the figure, addressing row lines $X_{n-2}'$, $X_n'$, ..., and $X_n$, $X_{n+2}$, ... for odd rows are formed to supply addressing gate signals in the right side of the data lines $Y_m$ and pass under pixel electrodes of even rows whereas addressing row lines $X_{n-1}'$ ..., and $X_{n+1}$, ... for even rows are formed to supply addressing gate signals in the left side of the data lines $Y_m$ and pass under pixel electrodes of odd rows. Namely, pixel electrodes on each column are arranged alternately in the right and left sides of the column line $Y_m$. The auxiliary capacitances are formed in the hatched areas in the figure. Namely, since each row line simply passes under the pixel electrode and is utilized only in the opposite side of the data line to drive adjacent pixels, the auxiliary capacitance is easily increased without increasing parasitic capacitance between the gate and the pixel electrode. This layout facilitates hexagonal arrangement of pixels which improves mixture of RGB color elements. An electro-optical device in accordance with the present invention comprises:

one pixel electrode provided on a substrate and connected with a (2i+1)-th gate line through a transistor, and a (2i+4)-th gate line through a transistor;

another pixel electrode provided on said substrate and connected with a (2i+2)-th gate line through a transistor, said (2i+2)-th gate line being provided on said substrate between said (2i+1)-th gate line and said (2i+4)-th gate line;

a further pixel electrode provided on said substrate and connected with a (2i+3)-th gate line through a transistor, said (2i+3)-th gate line being provided on said substrate between said (2i+2)-th gate line and said (2i+4)-th gate line; and a data line provided on said substrate between said one pixel electrode and said another pixel electrode and between said one pixel electrode and said further pixel electrode.

Said one pixel electrode is provided on said (2i+2)-th gate line, and said one pixel electrode and said (2i+2)-th gate line constitute a capacitor. Also, said one pixel electrode is provided on said (2i+3)-th gate line, and said one pixel electrode and said (2i+3)-th gate line constitute a capacitor.

In other words, an electro-optical device in accordance with the present invention comprises:

a pair of transistors having different conductivities provided for a pixel of n-th row;

a pair of gate lines connected with gate electrodes of said transistors;

a data line connected with one of source and drain of each of said transistors;

a pixel electrode connected with the other one of the source and drain of each of said transistors;

a gate line provided between said pair of gate lines and connected with a transistor provided for a pixel of (n+1)-th row; and a gate line provided between said pair of gate lines and connected with a transistor provided for a pixel of (n−1)-th row.

Said pixel electrode and said gate line connected with the transistor provided for the pixel of (n+1)-th row constitute a capacitor. Also, said pixel electrode and said gate line connected with the transistor provided for the pixel of (n−1)-th row constitute a capacitor. One of said pair of transistors has one of n-type and p-type conductivities and is connected with one of said pair of gate lines, and the other one of said pair of transistors has the other one of the n-type and p-type conductivities and is connected with the other one of said pair of gate lines, and said pixel electrode is provided on said gate line connected with the transistor provided for the pixel of (n+1)-th row and is provided on said gate line connected with the transistor provided for the pixel of (n−1)-th row.

This active matrix circuit can be manufactured in the same manner as the first embodiment as illustrated in FIGS. 8(A-1) to 8(D-1) and FIGS. 8(A-2) to 8(D-2). Also in this case, since the pixel electrodes are formed on the row lines with the thin aluminum oxide films therebetween which have a sufficient dielectric constant approximately twice as high as that of usual silicon oxide, a large auxiliary capacitance can be formed therebetween in the same manner as the first embodiment. If more large capacitances are desired as the auxiliary capacitance, the gate electrode may be formed of tantalum or titanium followed by anodic oxidation thereof to utilize the oxide of tantalum or titanium as the dielectric material.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated. For example, although the embodiments set forth above are directed to devices utilizing planer type TFTs which have been broadly employed in the polysilicon semiconductor technique, the present invention can be carried out with inverted staggered-type TFTs in the same manner. The present invention is also applied to other type displays capable of forming grayscale images in accordance with customary analog grading systems or digital grading systems as proposed by the applicants, e.g. as described in Japanese Application No. Hei 3-163873.

What is claimed is:

1. An electro-optical device comprising:

a first gate line;

a first pixel electrode connected with said first gate line through a first transistor;

a second gate line being adjacent to said first gate line and connected with a second pixel electrode through a second transistor;

a data line connected with said first transistor and said second transistor and extending across said first gate line and said second gate line;

a capacitor comprising said first pixel electrode, said second gate line, and an insulator provided between said first pixel electrode and said second gate line;

a third gate line extending in parallel with said first gate line with said second gate line intervening between said first and third gate lines;

a fourth gate line extending in parallel with said first gate line with said third gate line intervening between said second and fourth gate lines, wherein said first pixel electrode and said second pixel electrode are arranged so that said data line extends therebetween and wherein said first pixel electrode extends substantially from said first gate line to said third gate line and said second pixel electrode extends substantially from said second gate line to said fourth gate line.

2. The device of claim 1 wherein surfaces of said first gate line and said second gate line are covered with an anodic oxide.

3. The device of claim 1 wherein said first pixel electrode is connected with said first gate line through a p-channel transistor and an n-channel transistor, said second gate line is connected with said second pixel electrode through another p-channel transistor and another n-channel transistor.

4. The device of claim 1 wherein said first pixel electrode is connected with said first gate line through an n-channel transistor and connected with a third gate line through a p-channel transistor, said second pixel electrode is connected with said second gate line through another n-channel transistor and connected with a fourth gate line though another p-channel transistor.

5. An electro-optical device comprising:

a gate line of a n-th row connected with one transistor;

a gate line of a (n+1)-th row adjacent to said gate line of the n-th row connected with a second transistor;

a gate line of a (n+2)-th row being adjacent to said gate line of the (n+1)-th row and connected with another transistor;

a pixel electrode connected with said one transistor and said another transistor; and a capacitor comprising said pixel electrode, said gate line of the (n+1)-th row, and an insulator provided between said pixel electrode and said gate line of the (n+1)-th row.

6. The device of claim 5 wherein at least one of said one transistor and said another transistor has n-type conductivity.

7. The device of claim 5 wherein said one transistor has one of p-type and n-type conductivities, and said another transistor has the other one of the p-type and n-type conductivities.

8. The device of claim 5 wherein said pixel electrode is connected with one of source and drain of each of said one transistor and said another transistor.

9. The device of claim 5 further comprising a data line connected with said one transistor and said another transistor.

10. An electro-optical device comprising:

a first n-type transistor connected with a data line and a gate line of a n-th row;

a second p-type transistor connected with said data line and said gate line of the n-th row;

a third n-type transistor connected with said data line and a gate line of a (n−1)-th row adjacent to said gate line of the n-th row; and a fourth p-type transistor connected with said data line and said gate line of the (n−1)-th row, wherein said first transistor and said fourth transistor are provided on a side of said data line opposite to said second transistor and said third transistor.

11. An electro-optical device comprising:

a pair of transistors having different conductivities provided for a pixel of n-th row;

a pair of gate lines connected with gate electrodes of said transistors;

a data line connected with one of source and drain of each of said transistors;

a pixel electrode connected with the other one of the source and drain of each of said transistors;

a gate line provided between said pair of gate lines and connected with a transistor provided for a pixel of (n+1)-th row; and a gate line provided between said pair of gate lines and connected with a transistor provided for a pixel of (n−1)-th row.

12. The device of claim 11 wherein said pixel electrode and said gate line connected with the transistor provided for the pixel of (n+1)-th row constitute a capacitor.

13. The device of claim 11 wherein said pixel electrode and said gate line connected with the transistor provided for the pixel of (n−1)-th row constitute a capacitor.

14. The device of claim 11 wherein one of said pair of transistors has one of n-type and p-type conductivities and is connected with one of said pair of gate lines, and the other one of said pair of transistors has the other one of the n-type and p-type conductivities and is connected with the other one of said pair of gate lines, and said pixel electrode is provided on said gate line connected with the transistor provided for the pixel of (n+1)-th row and is provided on said gate line connected with the transistor provided for the pixel of (n−1)-th row.

15. An electro-optical device comprising:

one pixel electrode provided on a substrate and connected with a (2i+1)-th gate line through a transistor, and a (2i+4)-th gate line through a transistor;

another pixel electrode provided on said substrate and connected with a (2i+2)-th gate line through a transistor, said (2i+2)-th gate line being provided on said substrate between said (2i+1)-th gate line and said (2i+4)-th gate line;

a further pixel electrode provided on said substrate and connected with a (2i+3)-th gate line through a transistor, said (2i+3)-th gate line being provided on said substrate between said (2i+2)-th gate line and said (2i+4)-th gate line; and a data line provided on said substrate between said one pixel electrode and said another pixel electrode and between said one pixel electrode and said further pixel electrode, wherein i is a natural number.

16. The device of claim 15 wherein said one pixel electrode is provided on said (2i+2)-th gate line.

17. The device of claim 16 wherein said one pixel electrode and said (2i+2)-th gate line constitute a capacitor.

18. The device of claim 15 wherein said one pixel electrode is provided on said (2i+3)-th gate line.

19. The device of claim 18 wherein said one pixel electrode and said (2i+3)-th gate line constitute a capacitor.

20. A method of driving an electro-optical device of an active matrix comprising:

a first transistor of one of n-type and p-type conductivities connected with a gate line of a n-th row;

a second transistor of the other one of the n-type and p-type conductivities connected with a gate line of a (n+2)-th row; and a third transistor connected with a gate line of a (n+1)-th row;

said method comprising:

applying one of a positive signal and a negative signal to said gate line of the (n+2)-th row;

applying the other one of the positive signal and the negative signal to said gate line of the n-th row during the application of said one of the positive signal and the negative signal; and applying no signal to said gate line of the (n+1)-th row during the application of said one of the positive signal and the negative signal.

21. An electro-optical device comprising:

a first gate line;

a first pixel electrode connected with said first gate line through a first transistor;

a second gate line being adjacent to said first gate line and connected with a second pixel electrode through a second transistor;

a data line connected with said first transistor and said second transistor and extending across said first gate line and said second gate line; a capacitor comprising said first pixel electrode, said second gate line, and an insulator provided between said first pixel electrode and said second gate line;

a third gate line extending in parallel with said first gate line with said second gate line intervening between said first and third gate lines;

a fourth gate line extending in parallel with said first gate line with said third gate line intervening between said second and fourth gate lines, wherein said first pixel electrode is connected with said first gate line through an n-channel transistor and connected with a third gate line through a p-channel transistor, and said second pixel electrode is connected with said second gate line through another n-channel and connected with a fourth gate line through another p-channel transistor.

* * * * *